United States Patent
Chen et al.

(10) Patent No.: US 6,873,494 B2
(45) Date of Patent: Mar. 29, 2005

(54) WRITE HEAD WITH HIGH MOMENT FILM LAYER HAVING TAPERED PORTION EXTENDING BEYOND WRITE GAP LAYER

(75) Inventors: Yingjian Chen, Fremont, CA (US); Xiaozhong Dang, Fremont, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 81 days.

(21) Appl. No.: 10/134,799

(22) Filed: Apr. 29, 2002

(65) Prior Publication Data

US 2003/0202278 A1 Oct. 30, 2003

(51) Int. Cl.[7] .............................................. G11B 5/31
(52) U.S. Cl. ...................................................... 360/126
(58) Field of Search .................................. 360/126, 317

(56) References Cited

U.S. PATENT DOCUMENTS

| | | | | |
|---|---|---|---|---|
| 4,589,042 A | * | 5/1986 | Anderson et al. ........... 360/125 |
| 5,639,509 A | | 6/1997 | Schemmel | |
| 5,751,526 A | | 5/1998 | Schemmel | |
| 5,828,533 A | * | 10/1998 | Ohashi et al. .............. 360/126 |
| 6,032,353 A | * | 3/2000 | Hiner et al. ............. 29/603.14 |
| 6,172,848 B1 | * | 1/2001 | Santini ....................... 360/126 |
| 6,317,290 B1 | * | 11/2001 | Wang et al. ................ 360/126 |
| 6,369,984 B1 | * | 4/2002 | Sato ........................... 360/126 |
| 6,430,806 B1 | * | 8/2002 | Chen et al. ................. 360/126 |
| 6,452,743 B1 | * | 9/2002 | Sasaki ........................ 360/126 |
| 6,469,875 B1 | * | 10/2002 | Chen et al. ................. 360/317 |
| 6,525,902 B1 | * | 2/2003 | Hu et al. .................... 360/126 |
| 6,525,905 B1 | * | 2/2003 | Sasaki ........................ 360/126 |
| 6,618,223 B1 | * | 9/2003 | Chen et al. ................. 360/126 |
| 2002/0024776 A1 | * | 2/2002 | Sasaki et al. .............. 360/317 |
| 2002/0067570 A1 | * | 6/2002 | Sasaki et al. .............. 360/126 |

* cited by examiner

*Primary Examiner*—Craig A. Renner
(74) *Attorney, Agent, or Firm*—Joshua C. Harrison, Esq.; Milad G. Shara, Esq.; Hogan & Hartson LLP

(57) ABSTRACT

An inductive write head structure incorporating a high moment film in conjunction with at least one pole (e.g., the bottom pole) for use with magnetic storage media and a process for producing the same in which a lift-off photoresist mask is used prior to the deposition of the high moment sputtered film. Following the lift-off process, the high moment film remains on the bottom pole ("P1") pedestal (in the case of a PDZT type write head) or on the P1 itself (in the case of a Stitched Pole write head). The edge of the lift-off sputtered film is then covered by cured photoresist insulation which is placed at a distance away from the air bearing surface ("ABS"). The coverage of insulation at the edge of the sputtered film is desirable in order to avoid forming a topographic step which may have undesired consequences in the subsequent top pole formation processes.

19 Claims, 3 Drawing Sheets

WRITE HEAD WITH HIGH MOMENT FILM LAYER HAVING TAPERED PORTION EXTENDING BEYOND WRITE GAP LAYER

BACKGROUND OF THE INVENTION

The present invention relates, in general, to the field of magnetic recording heads. More particularly, the present invention relates to an inductive write head structure incorporating a high moment film in conjunction with at least one pole (e.g., the bottom pole) for use with magnetic storage media and a process for producing the same.

Recording heads are miniature components (with dimensions of on the order of about 1 $mm^2$) that read and write information to and from a hard-drive disk or another storage medium. When writing, the head acts as a small electromagnet wherein positive and negative pulses of current are translated into north and south magnetic poles on a rotating magnetic disk. When reading, the head senses magnetic fields from these poles and translates the alternating fields into positive and negative voltage pulses. These pulses become the bits of digital information stored on the disk. A recording head is generally bonded or otherwise affixed to a metal suspension, which is a small arm that holds the head in position above or beneath a rotating disk. The head and suspension is sometimes referred to as a head-gimbal assembly or HGA. Sets of HGA's stacked together for installation in a disk drive are denominated a head-stack assembly or HSA.

In general, recording heads function according to certain principles of magnetic recording which are based directly on four magnetic phenomena. These are: a) an electric current produces an accompanying magnetic field; b) Soft magnetic materials are easily magnetized when placed in a weak magnetic field and, when the field is turned off, the material rapidly demagnetizes; c) In some magnetically soft materials the electrical resistance changes when the material is magnetized and this resistance returns to its original value when the magnetizing field is turned off. This is the magnetoresistive ("MR") effect. The larger giant magnetoresistive ("GMR") effect, is exhibited by specific thin film materials systems; and d) Certain other materials are magnetized only with relatively greater difficulty (i.e., they require a strong magnetic field), but once magnetized, they retain their magnetization when the field is turned off. These are called hard magnetic materials or permanent magnets.

With respect to data storage, heads used for writing bits of information onto a spinning magnetic disk depend on phenomena a) and b) to produce and control strong magnetic fields. Reading heads depend on phenomena a), b), and c), and are sensitive to the residual magnetic fields of magnetized storage media d). On the other hand, magnetic storage media are permanently magnetized in a direction (North or South) determined by the writing field. Storage media exploit phenomenon d).

In the writing of data, a spiral coil is wrapped between two layers of soft magnetic material and at the lower end, there is a gap between these layers. At their upper end, these layers are joined together. The top and bottom layers of magnetic material are readily magnetized when an electric current flows in the spiral coil, so these layers become effectively the "North" and "South" magnetic poles of a small electromagnet. [In an actual head, the distance from the gap to the top of the coil may be on the order of about 30 microns (or 0.0012 inch).] The North-South poles at the gap end of the writing head further concentrate the field at this point, which is the area where the writing field leaks into space outside the head. When a magnetic storage medium (a spinning computer disk, for example) is placed in close proximity to the writing head, the hard magnetic material on the disk surface is permanently magnetized (or written) with a polarity that matches the writing field. If the polarity of the electric current is reversed, the magnetic polarity at the gap also reverses.

Computers store data on a rotating disk in the form of binary digits, or bits, transmitted to the disk drive in a corresponding time sequence of binary one and zero digits, or bits. These bits are converted into an electric current waveform that is delivered by wires to the writing head coil. In its simplest form, a "one" bit corresponds to a change in current polarity, while a "zero" bit corresponds to no change in polarity of the writing current. A moving disk is thus magnetized in the positive (North) direction for positive current and is magnetized in the negative (South) direction for negative current flow. In other words, the stored "ones" show up where reversals in magnetic direction occur on the disk and the "zeroes" reside between the "ones".

A timing clock is synchronized to the rotation of the disk and bit cells exist for each tick of the clock. Some of these bit cells will represent a "one" (a reversal in magnetic direction such as North going to South or South going to North) and others represent "zeroes" (constant North or constant South polarity). Once written, the bits at the disk surface are permanently magnetized in one direction or the other until new data patterns are written over the old. A fairly strong magnetic field exists directly over the location of "ones" and fades rapidly in strength as the recording head moves away. Moving significantly in any direction away from a "one" causes a dramatic loss of magnetic field strength. Thus, to reliably detect data bits, it is extremely important for reading heads to fly very close to the surface of a magnetized disk.

A basic writing head generally comprises a magnetic yoke, a writing gap in the yoke, and a coil for energizing the head field. Conventional reading heads have a GMR element with excitation/sensing leads and magnetic shield layers on both sides of the sensor. While writing and reading are clearly independent functions, it is very important to place write and read heads in close proximity to the recording medium, both to have the write gap and GMR element close to each other as well as to maintain tight geometrical alignment between both heads. In this manner, the top shield of the GMR sensor becomes the bottom magnetic pole of the writing head and the result is an integrated write-read structure, or so-called "merged-head" or "shared shield" design, where the GMR head and writing head share a common magnetic layer.

Previously, there have been described the use of a flux enhanced layer in conjunction with the bottom pole of a write transducer in a "shared shield" design. See, for example, U.S. Pat. No. 5,639,509 issued Jun. 17, 1997 for: "Process for Forming a Flux Enhanced Magnetic Data Transducer" and U.S. Pat. No. 5,751,526 issued May 12, 1998 for: "Flux Enhanced Write Transducer and Process for Producing the Same in Conjunction with Shared Shields on Magnetoresistive Heads". However, neither of these patents address the coverage of the edge of the flux enhanced layer by an insulating layer to avoid forming a topographic step which may have undesired consequences in the subsequent top pole formation processes.

SUMMARY OF THE INVENTION

In an exemplary implementation disclosed herein, the present invention contemplates the use of a sputtered high moment film on, or in conjunction with, at least one pole (e.g. the bottom pole) of a write head. The Pole 1 ("P1") sputtered materials may be used in, for example, two different write head designs including pedestal define zero-throat ("PDZT") or stitched top pole with zero-throat defined by photoresist insulation ("Stitched Pole write head") configurations.

In accordance with a representative process disclosed herein, a lift-off photoresist mask is used prior to the deposition of the high moment sputtered film. Following the lift-off process, the high moment film remains on the P1 pedestal (in the case of a PDZT type write head) or on the P1 itself (in the case of a Stitched Pole write head). The edge of the lift-off sputtered film is then covered by cured photoresist insulation which is placed at a distance away from the air bearing surface ("ABS"). The coverage of insulation at the edge of the sputtered film is desirable in order to avoid forming a topographic step which may have undesired consequences in the subsequent top pole formation processes. In the case of PDZT type write heads, the lift-off sputtered film extends further away from the ABS than the zero-throat defining pedestal while in the case of a Stitched Pole write head, the photoresist insulation is at a short distance (throat height) away from the ABS. A gap layer is used to cover the sputtered film after the lift-off process. This prevents oxidation or corrosion of the high moment materials during the high temperature cure of the photoresist insulation.

Particularly disclosed herein is a write head for a computer mass storage device which includes a first pole comprising a first magnetic material layer. A high moment film layer is formed in an overlying relationship to at least a portion of the first pole adjoining an air bearing surface of the write head with the high moment film layer having a distal end portion adjacent the air bearing surface and a proximal end portion oppositely disposed thereto. A write gap layer is formed overlying at least a portion of the high moment film layer and at least one insulating layer is formed in an overlying relationship with the first pole with the insulating layer further at least partially overlying the proximal end portion of the high moment film. A second pole comprising a second magnetic material layer then overlies the insulating layer and the write gap layer.

Also particularly disclosed herein is a process for forming a write head which comprises: providing a first magnetic layer; forming a high moment film layer in an overlying relationship to at least a portion of the first magnetic layer adjoining an air bearing surface of the write head, with the high moment film layer having a distal end portion adjacent the air bearing surface and a proximal end portion oppositely disposed thereto. The process further comprises: forming a write gap layer overlying at least a portion of the high moment film layer; forming at least one insulating layer in an overlying relationship with the first magnetic layer, the insulating layer further at least partially overlying the proximal end portion of the high moment film and forming a second magnetic layer overlying the insulating layer and the write gap layer.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
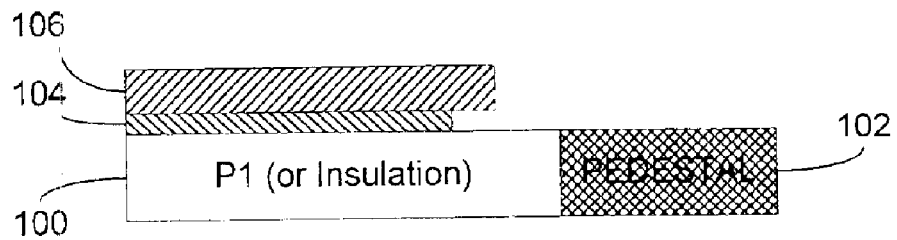
FIG. 1A is a simplified cross-sectional view of one of a sequence of steps which may be utilized in order to produce a PDZT write head in accordance with a representative implementation of the present invention illustrating a planarized bottom pole ("P1") (or insulation layer) in association with an adjoining pedestal and over which has been formed patterned polymethylglutarimide ("PMGI") and photoresist layers.

With reference now to FIG. 1A, a simplified cross-sectional view of one of a sequence of steps which may be utilized in order to produce a PDZT write head in accordance with a representative implementation of the present invention is shown. As illustrated, a bottom pole ("P1") or insulation layer (e.g. $Al_2O_3$ and the like) 100 is provided in conjunction with a pedestal structure 102.

The pedestal structure 102 may comprise conventional electroplated CoNiFe or other NiFe alloys and is planarized with the bottom pole 100 (for example, using chemical mechanical polishing ("CMP") techniques) to provide a combined structure having a thickness of approximately 1.0 μm. Overlying the bottom pole 100 and pedestal 102 is a patterned polymethylglutarimide ("PMGI") layer 104 and photoresist layer 106. The PMGI layer 104 dissolves relatively more quickly than the photoresist layer 106 in the developer agent. The photoresist layer 106 forms an overhang with respect to the PMGI layer 104 as shown which is of use in follow-on processing as will be more fully described hereinafter.

Figure 1B:
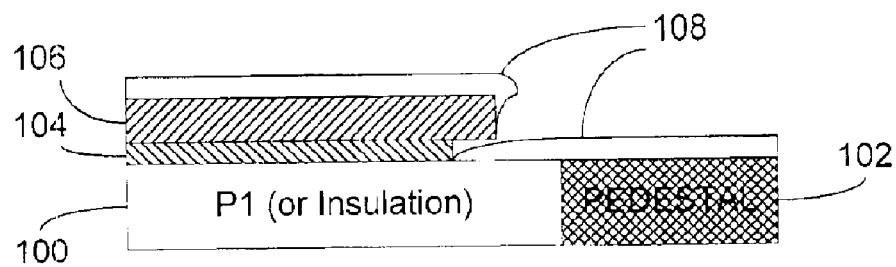
FIG. 1B is a follow-on, simplified cross-sectional view of a subsequent step in the formation of a write head in accordance with a representative implementation of the present invention wherein a high moment layer has been provided on the upper surfaces of the structure of the preceding figure.

With reference additionally now to FIG. 1B, a follow-on, simplified cross-sectional view of a subsequent step in the formation of a write head in accordance with a representative implementation of the present invention is shown. As illustrated, a high moment material layer 108 has been provided on the upper surfaces of the structure of the preceding figure. The high moment layer 108 may, in a representative embodiment, comprise a sputtered layer of between approximately 0.1 to 1.0 μm of CoFeN, FeXN, CoFeXn (where X=Rh, Ta, Al, Ti etc.) and the like. The layer 108 may be formed as either a single layer or in a laminated form comprising one or more layers.

Figure 1C:
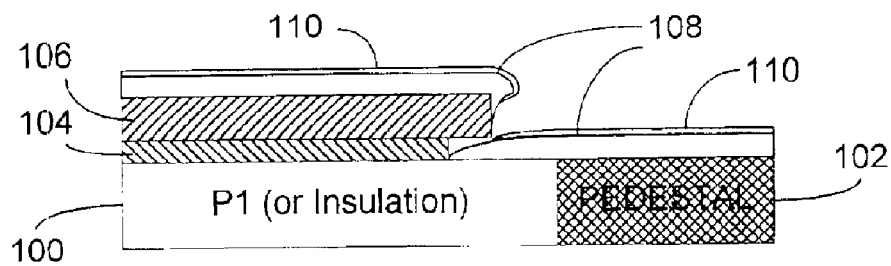
FIG. 1C is a follow-on, simplified cross-sectional view of a subsequent step in the formation of a write head in accordance with a representative implementation of the present invention wherein a write gap layer has been provided overlying the high moment layer of the preceding figure.

With reference additionally now to FIG. 1C, a follow-on, simplified cross-sectional view of a subsequent step in the formation of a write head in accordance with a representative implementation of the present invention is shown. As illustrated, a write gap layer 110 has been deposited overlying the high moment layer 108 of the preceding figure. Suitable materials for the write gap layer 110 may be selected from a group comprising metallic or dielectric materials which are non-magnetic. The write gap layer has a thickness that is typically on the order of 2000 Angstroms (200 nm) or below.

Figure 1D:
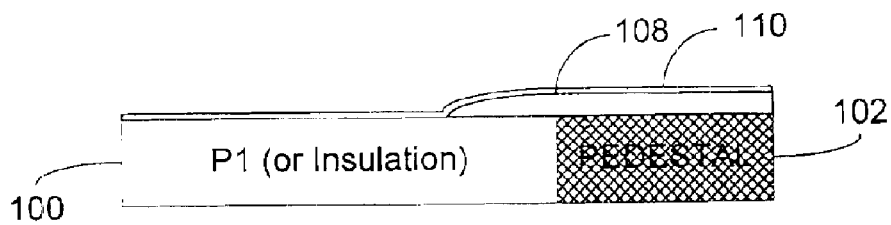
FIG. 1D is a follow-on, simplified cross-sectional view of a subsequent step in the formation of a write head in accordance with a representative implementation of the present invention wherein the PMGI and photoresist layers have been lifted-off leaving the high moment material and write gap layer overlying the pedestal.

With reference additionally now to FIG. 1D, a follow-on, simplified cross-sectional view of a subsequent step in the formation of a write head in accordance with a representative implementation of the present invention is shown. In this figure, the PMGI and photoresist layers 104, 106 have been lifted-off leaving the high moment material of layer 108 and write gap layer 110 overlying the pedestal 102 and adjoining bottom pole (or insulation) layer 100.

Figure 1E:
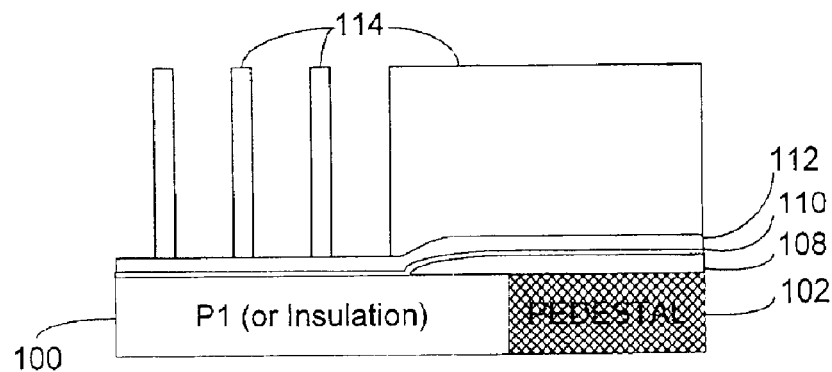
FIG. 1E is a follow-on, simplified cross-sectional view of a subsequent step in the formation of a write head in accordance with a representative implementation of the present invention wherein a coil seed layer has been deposited overlying the structure of the preceding figure in addition to the production of a patterned photoresist mask for defining the write head coils.

With reference additionally now to FIG. 1E, a follow-on, simplified cross-sectional view of a subsequent step in the formation of a write head in accordance with a representative implementation of the present invention is shown In this figure, a coil seed layer 112 has been deposited overlying the structure of the preceding figure in addition to the production of a patterned photoresist mask 114 for defining the write head coils.

Figure 1F:
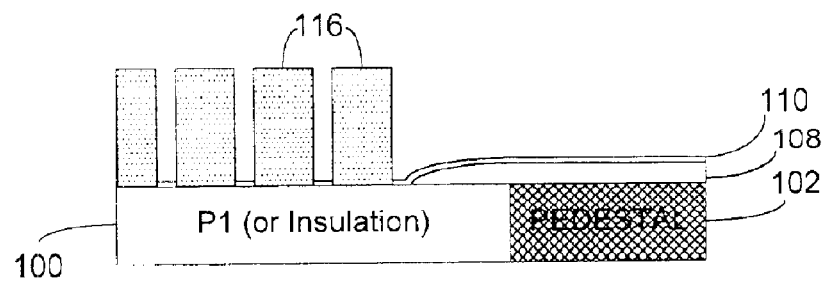
FIG. 1F is a follow-on, simplified cross-sectional view of a subsequent step in the formation of a write head in accordance with a representative implementation of the present invention wherein the coils have been plated and the patterned photoresist layer of the preceding figure removed.

With reference additionally now to FIG. 1F, a follow-on, simplified cross-sectional view of a subsequent step in the formation of a write head in accordance with a representative implementation of the present invention is shown. In this figure, the coils 116 have been plated and the patterned photoresist layer 114 of the preceding figure has been removed.

Figure 1G:
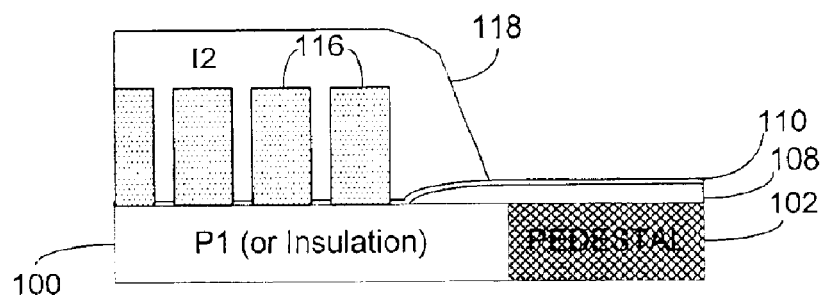
FIG. 1G is a follow-on, simplified cross-sectional view of a subsequent step in the formation of a write head in accordance with a representative implementation of the present invention wherein an insulation layer has been formed surrounding the coil and then cured.

With reference additionally now to FIG. 1G, a follow-on, simplified cross-sectional view of a subsequent step in the formation of a write head in accordance with a representative implementation of the present invention is shown. In this figure, an insulation layer 118, (e.g. photoresist) which may be designated as Insulation 2 ("I2") has been formed surrounding the coil 116 and then cured. The insulation layer 118 serves to protect the coil and it should be noted the edge of the insulation layer 118 covers the edge of the lift-off high moment material layer 108.

Figure 1H:
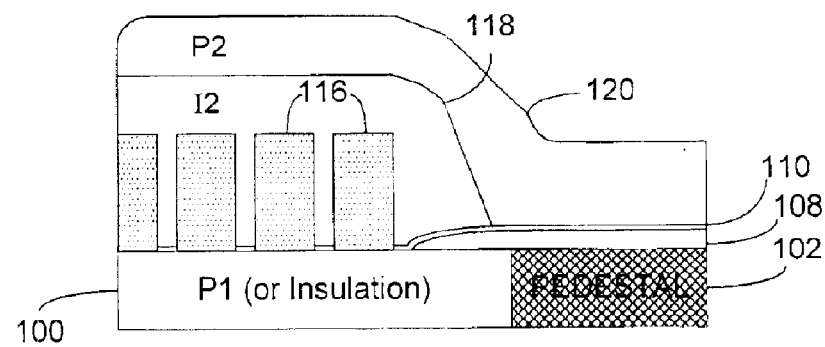
FIG. 1H is a follow-on, simplified cross-sectional view of a subsequent step in the formation of a write head in accordance with a representative implementation of the present invention wherein the top pole ("P2") has been formed overlying the insulation layer and the write gap adjoining the write head air bearing surface.

With reference additionally now to FIG. 1H, a follow-on, simplified cross-sectional view of a subsequent step in the formation of a write head in accordance with a representative implementation of the present invention is shown. In this final illustration, the top pole ("P2") 120 has been formed overlying the insulation layer 118 and the write gap layer 110 adjoining the write head air bearing surface. The top pole 120 may be formed of plated NiFE, CoNiFe high moment alloys, sputtered high moment materials or combinations of both. It should also be noted that the process steps previously illustrated and described with respect to the formation of the coil 116 (FIGS. 1E through 1F) and formation of the write gap layer 110 may be interchanged depending upon the particular write gap material utilized and other process parameters.

Figure 2:
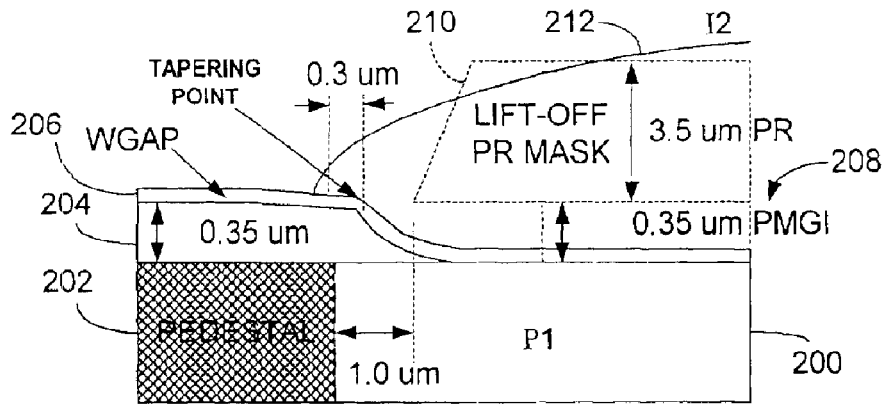
FIG. 2 is a simplified cross-sectional view of a write head incorporating a structure in accordance with a representative implementation of the present invention incorporating sputtered high moment material overlying the pedestal and indicating that some overlap of the cured insulation edge with that of the lift-off edge of the sputtered film is desirable in certain applications.

With reference additionally now to FIG. 2, a simplified cross-sectional view of a write head incorporating a structure in accordance with a representative implementation of the present invention is shown. In this figure, a bottom pole 200 is formed adjacent to the pedestal 202 which includes a high moment layer 204 overlying the same in the region adjacent the pedestal 202. A write gap ("WGAP") layer 206 then overlies the high moment layer 204 and portions of the bottom pole 200. As shown, the high moment layer 204 may be approximately 0.35 μm in thickness.

A correspondingly thick PMGI layer 208 has been used to determine the thickness of the high moment layer 204 when utilized in conjunction with the lift-off photoresist ("PR") layer 210 which has a corresponding thickness of substantially 3.5 μm. The I2 layer 212 is illustrated with a 0.3 μm overlap of the high moment layer 204 from the edge of the pedestal 202 to the "tapering point" illustrated. The "tapering point" is the point beyond which the film comprising the high moment layer 204 is substantially planar (or flat). It should be noted that the best results are achieved when the insulation layer 212 (e.g. I2 or I1) overlaps the high moment layer 204 beyond the "tapering point" such that the exposed region of the latter is substantially planar (or flat).

Figure 3:
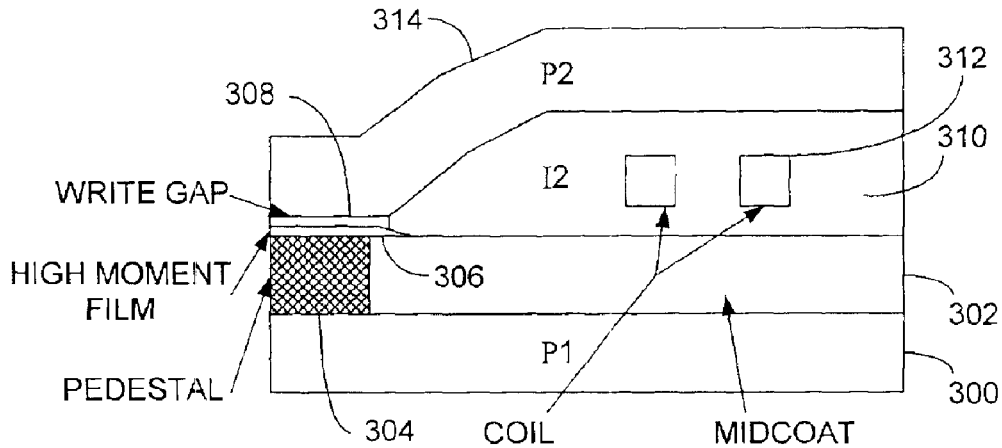
FIG. 3 is a somewhat more detailed cross-sectional view of the write head of the preceding figure in which a PDZT type write head has been provided in accordance with the structure and method of the present invention.

With reference additionally now to FIG. 3, a somewhat more detailed cross-sectional view of the write head of the preceding figure is shown in which a PDZT type write head has been provided in accordance with the structure and method of the present invention. In this figure, a bottom pole ("P1") 300 underlies a midcoat layer 302 and a generally co-planar pedestal 304. In a representative embodiment, the bottom pole 300 may comprise plated NiFe or CoNiFe alloys and the midcoat layer 302 may comprise $Al_2O_3$ or other suitable material providing electrical insulation and magnetic separation.

A high moment film layer 306 overlies the pedestal 304 and may comprise any of the materials mentioned previously. Similarly, a write gap layer 308 overlies the high moment film layer 306 and may comprise, for example, any suitable metallic or dielectric material which is non-magnetic. An insulation ("I2") layer 310 is formed over the midcoat layer 302 and overlaps the edge of the high moment film layer 306 as well as surrounding the coil 312. A top pole ("P2") 314 is then formed overlying the I2 layer 310 and write gap layer 308.

Figure 4:
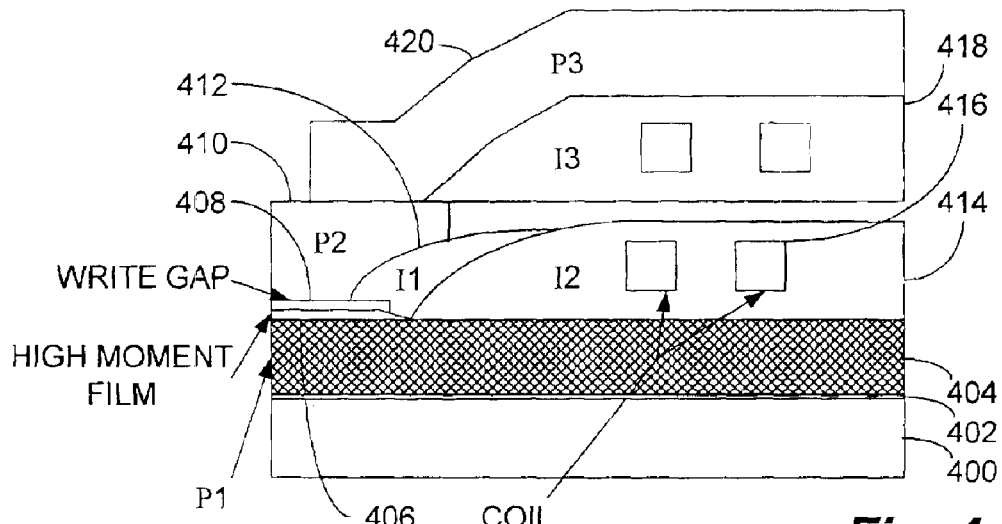
FIG. 4 is a simplified cross-sectional view of an alternative implementation of a write head in accordance with the structure and method of the present invention wherein a Stitched Pole write head has been provided.

With reference additionally now to FIG. 4, a simplified cross-sectional view of an alternative implementation of a write head in accordance with the structure and method of the present invention is shown wherein a Stitched Pole write head has been provided. In this figure, a first layer 400 and a non-magnetic layer 402 underlie the bottom pole 404 with the layer 402 generally serving to decouple the read and write head elements in a "merged head" design. As previously described, the bottom pole 404 may, for example, comprise plated NiFe or CoNiFe.

A high moment film layer 406 overlies a portion of the bottom pole 404 and may comprise any of the materials mentioned previously. Similarly, a write gap layer 408 overlies the high moment film layer 406 and may comprise, for example, any suitable metallic or dielectric material which is non-magnetic. An intermediate pole element 410 ("P2") is formed overlying the write gap layer 408 in conjunction with a first insulation layer ("I1") 412 which overlies end portions of the high moment film layer 406 and the write gap layer 408 and, in the particular embodiment illustrated, (although it may not in other embodiments) extends at least partially over a second insulation layer ("I2") 414 into which a coil 416 has been formed. A third insulation layer ("I3") 418 generally overlies the second insulation layer 414 and a third pole ("P3") 420 is formed thereover in contact with the intermediate pole element 410 as shown. The first insulation layer 412 may be formed of cured photoresist and is used to define the "zero throat" which is the diverging point of the top and bottom poles. Typically, it is formed to be thinner than the I2 layer 414 such that the slope (or apex angle) is more gentle.

While there have been described above the principles of the present invention in conjunction with specific write head structure and processing steps, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A write head for a computer mass storage device comprising:
   a first pole;
   a high moment film layer overlying at least a portion of the first pole, wherein the high moment film layer has a distal end adjacent an air bearing surface and a tapered proximal end opposite the distal end;
   a write gap layer overlying a portion of the high moment film layer, wherein said portion of the high moment film layer is less than the entire high moment film layer;
   a first insulating layer in an overlying relationship with said first pole, and a second insulating layer overlying and abutting at least a portion of the first insulating layer and also at least partially overlying and abutting at least a portion of said tapered proximal end of said high moment film layer; and
   a second pole overlying the first and second insulating layers and the write gap layer.

2. The write head of claim 1 comprising at least one write head coil between the first pole and the second pole.

3. The write head of claim 2, wherein the first insulating layer is in contact with said at least one write head coil.

4. The write head of claim 1, wherein the high moment film layer comprises a tapering point, wherein a top surface of the high moment film layer between the distal end and the tapering point is substantially flat.

5. The write head of claim 4, wherein the second insulation layer overlays the high moment film layer between the distal end and the tapering point of said high moment film layer.

6. The write head of claim 1, wherein the second insulation layer comprises a boundary that defines a zero-throat for the second pole.

7. A write head for a computer mass storage device comprising:
   a first pole comprising a first magnetic material layer;
   a high moment film layer in an overlying relationship to at least a portion of said first pole, said high moment film layer having a distal end portion adjacent an air bearing surface and a tapered proximal end portion oppositely disposed thereto;
   a pedestal interposed between said first pole and said high moment film layer;
   a write gap layer overlying a portion of said high moment film layer, wherein the write gap layer does not overlie the entire high moment film layer;
   at least one insulating layer in an overlying relationship with said first pole, said insulating layer further at least partially overlying said proximal end portion of said high moment film layer; and
   a second pole comprising a second magnetic material layer overlying said at least one insulating layer and said write gap layer.

8. The write head of claim 7 wherein said pedestal comprises CoNiFe or NiFe alloy.

9. The write head of claim 7 wherein said proximal end portion of said high moment film layer extends medially a first distance beyond a proximal end portion of said pedestal.

10. The write head of claim 9 wherein said first distance is substantially 1.0 $\mu$m.

11. The write head of claim 7 further comprising:
    a midcoat layer overlying said first pole and substantially coplanar with said pedestal.

12. The write head of claim 11 wherein said midcoat layer comprises $Al_2O_3$.

13. The write head of claim 7 wherein said write gap layer comprises a non-magnetic metallic or dielectric material.

14. The write head of claim 7 wherein said at least one insulating layer is further in an at least partially overlying relationship with a proximal and portion of said write gap layer.

15. The write head of claim 7 further comprising:
    at least one write coil formed in said at least one insulating layer.

16. The write head of claim 7 wherein said first pole comprises NiFe or CoNiFe.

17. The write head of claim 7 wherein said high moment film layer comprises CoFeN, FeXN or CoFeXN where X is Rh, Ta, Al, Ti.

18. The write head of claim 7 wherein said high moment film layer is substantially 0.35 $\mu$m thick.

19. The write head of claim 7 wherein said second pole comprises NiFe or CoNiFe.

* * * * *